US009975980B2

(12) United States Patent
Destarac et al.

(10) Patent No.: US 9,975,980 B2
(45) Date of Patent: May 22, 2018

(54) PREPARATION OF HYDROPHILIC POLYMERS OF HIGH MASS BY CONTROLLED RADICAL POLYMERIZATION

(75) Inventors: Mathias Destarac, Toulouse (FR); Aymeric Guinaudeau, Louplande (FR); Stéphane Mazieres, Castanet-Tolosen (FR); James Wilson, Coye-la-Foret (FR)

(73) Assignees: RHODIA OPERATIONS, Aubervilliers (FR); CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 329 days.

(21) Appl. No.: 13/876,887

(22) PCT Filed: Sep. 27, 2011

(86) PCT No.: PCT/FR2011/052254
§ 371 (c)(1),
(2), (4) Date: Jun. 25, 2013

(87) PCT Pub. No.: WO2012/042167
PCT Pub. Date: Apr. 5, 2012

(65) Prior Publication Data
US 2013/0267661 A1 Oct. 10, 2013

(30) Foreign Application Priority Data
Sep. 30, 2010 (FR) ...................................... 10 57900

(51) Int. Cl.
C08F 2/38 (2006.01)
C08F 271/00 (2006.01)
C08F 293/00 (2006.01)

(52) U.S. Cl.
CPC .............. *C08F 271/00* (2013.01); *C08F 2/38* (2013.01); *C08F 293/005* (2013.01); *C08F 2400/02* (2013.01)

(58) Field of Classification Search
CPC .................... C08F 2438/03; C08F 293/005
See application file for complete search history.

(56) References Cited

U.S. PATENT DOCUMENTS

| 3,002,279 | A | 10/1961 | Kolodny et al. |
| 3,002,960 | A | 10/1961 | Miller |
| 3,022,279 | A | 2/1962 | Proffitt et al. |
| 3,480,761 | A | 11/1969 | Kolodny et al. |
| 3,929,791 | A | 12/1975 | Gerecke et al. |
| 4,455,411 | A | 6/1984 | Handa et al. |
| 5,763,548 | A | 6/1998 | Matyjaszewski et al. |
| 6,153,705 | A | 11/2000 | Corpart et al. |
| 6,355,718 | B1 | 3/2002 | Berge et al. |
| 6,380,335 | B1 | 4/2002 | Charmot et al. |
| 6,437,040 | B2 | 8/2002 | Anthony et al. |
| 6,545,098 | B1 | 4/2003 | Bouhadir et al. |
| 6,605,674 | B1* | 8/2003 | Whipple .............. B03D 1/1431 525/244 |
| 6,642,318 | B1 | 11/2003 | Chiefari et al. |
| 6,777,513 | B1 | 8/2004 | Destarac et al. |
| 6,809,164 | B2 | 10/2004 | Destarac et al. |
| 7,064,151 | B1 | 6/2006 | Berge et al. |
| 7,250,479 | B2 | 7/2007 | Le et al. |
| 7,449,439 | B2 | 11/2008 | Ito et al. |
| 8,163,100 | B2 | 4/2012 | Karagianni et al. |
| 2007/0073011 | A1* | 3/2007 | Favier ...................... C08F 2/00 526/73 |
| 2010/0004152 | A1* | 1/2010 | Karagianni et al. .......... 510/180 |
| 2011/0092634 | A1 | 4/2011 | Gonzalez et al. |
| 2011/0271460 | A1 | 11/2011 | Karagianni et al. |

FOREIGN PATENT DOCUMENTS

| FR | 2794464 | | 12/2000 |
| WO | WO 01/016187 A1 | * | 3/2001 |
| WO | WO 2010046342 A1 | * | 4/2010 |
| WO | WO 2011159949 A2 | * | 12/2011 |

OTHER PUBLICATIONS

Machine Translation of WO 2001/016187.*
McCormick et al. Soft Matters, 2008, 4, 1760-1773.*
Perrier et al. Journal of Polymer Science Part A: Polymer Chemistry, vol. 43, 5347-5399, 2005.*
International Search Report for PCT/FR2011/052254 dated Nov. 21, 2011.

* cited by examiner

*Primary Examiner* — Mark S Kaucher
(74) *Attorney, Agent, or Firm* — B. Aaron Schulman, Esq.; Stites & Harbison, PLLC

(57) ABSTRACT

The present invention concerns a process for preparing a polymer comprising at least one gel polymerization step (E) in which the following are contacted:
  ethylenically unsaturated water-soluble monomers, the same or different;
  a source of free radicals adapted to the polymerization of the said monomers, typically a redox system; and
  a radical polymerization control agent, preferably comprising a thiocarbonylthio —S(C=S)— group;
with a concentration of monomers in the reaction medium of step (E) sufficiently high to cause gelling of the medium if polymerization was conducted without the control agent.

8 Claims, No Drawings

PREPARATION OF HYDROPHILIC POLYMERS OF HIGH MASS BY CONTROLLED RADICAL POLYMERIZATION

The present invention pertains to an original polymerization process giving access to water-soluble polymers of very high mass, typically of the order of 100 000 to 1 000000 g/mol, whilst controlling the mass of these polymers. The invention also concerns the water-soluble polymers of controlled high mass thus obtained which can be used in particular as rheological agents, surface modifiers and flocculating agents.

With conventional radical polymerization, different processes are known allowing water-soluble polymers to be obtained of very high mass. In particular, the implementing has been described of water-in-oil inverse emulsion polymerization processes which allow the hydrophilic polymer (e.g. polyacrylamide) to be collected by inverse emulsion. Another means for obtaining hydrophilic polymers of high mass is polymerization in solution in water at low temperature (generally between 5° C. and 25° C.), typically with redox initiation.

More specifically, so-called gel polymerization methods have been developed which allow polymers of very high mass to be obtained. In methods of this type, a low concentration of an adapted redox pair is contacted at low temperature and in an aqueous medium with at least one hydrophilic monomer (typically acrylamide). In these methods, the concentration of monomer in the water is chosen to be sufficiently high so that the reaction medium gels rapidly during polymerization. At the end of the reaction, the polymer is in the form of a physical gel in water, which is typically a non-covalent gel essentially formed by reversible physical interactions such as hydrogen bonds for example. It is collected, dried and ground. Under these conditions, polyacrylamides of $M_n$ values much higher than $10^6$ g/mol ($>10^7$ g/mol) can be obtained.

In the present invention, and unless indicated to the contrary, a <<physical gel>> designates a non-covalent gel of the aforementioned type, excluding chemically cross-linked structures of resin type for example. In particular, these physical gels such as obtained using gel polymerization processes, differ from the so-called <<nanogel>> or <<microgel>> structures described for example in WO 2010/046342 or WO 2008/155282 which comprise globules of a chemically cross-linked phase (wrongly described as <<gelled>>) in a dispersing medium.

It is true that these methods give access to polymers of high mass and generally with high reaction rates. Nonetheless, they prove not to be fully satisfactory. In particular, the rapid gelling of the medium generates very high exothermicity which notably entails the use of specific initiator systems. More fundamentally, gel polymerization processes are not able to ensure control over the size and architecture of the formed polymer chains. In particular, gel polymerization does not provide access to sequenced polymers (diblocks for example).

In addition, and conversely, polymerization processes are known which ensure fine-tuned control over the molecular weight of polymers but which do not however provide access to very high molecular weights, in particular when it is desired to perform polymerization in aqueous phase.

More precisely, at the current time different processes are known for controlled radical polymerization, under the names RAFT or MADIX for example, which allow polymers to be obtained of controlled architecture and mass. These methods typically use a reversible transfer process by addition-fragmentation using control agents (also called reversible transfer agents) e.g. of xanthate type (compounds carrying —SC=SO— functions). As examples of such methods, particular mention can be made of those described in WO96/30421, WO 98/01478, WO 99/35178, WO 98/58974, WO 00/75207, WO 01/42312, WO 99/35177, WO 99/31144, FR2794464 or WO 02/26836.

These methods called <<controlled radical polymerization>> lead, in well-known manner, to the formation of polymer chains which all grow substantially at the same rate, which translates as a substantially linear increase in molecular weights with conversion and a narrowed weight distribution, with a number of chains which typically remains fixed throughout the entire duration of the reaction, providing very easy control over the average molecular weight of the synthesized polymer (this weight is higher the lower the initial concentration of control agent, this concentration dictating the number of growing polymer chains).

Therefore, for example, the controlled polymerization processes of acrylamide disclosed to date lead to polymers of relatively limited size. Among the examples of controlled acrylamide polymerization processes leading to polymers of the largest sizes, mention can be made of:

RAFT polymerization of the acrylamide initiated via ambient redox route described in *Macromolecular Rapid Communications*, vol. 29, N° 7, pp. 562-566 (2008), which leads to polyacrylamides having a number-average molecular weight of no more than 40 000 g/mol; and a RAFT polymerization process by inverse mini-emulsion described in *Macromolecular Rapid Communications*, vol. 28, no. 9, p. 1010 (2007), which leads to number-average molecular weights of up to 70 000-80 000 g/mol.

These articles amount to exceptions, the sizes of the polymers obtained with controlled radical polymerization processes generally being much lower than these extreme values found in the literature.

It is one objective of the invention to provide a process with which it is possible to provide a process allowing both hydrophilic polymers to be obtained of very high molecular weight, much higher than 100 000 g/mol, preferably at least 500 000 g/mol, whilst ensuring control over the molecular weight of the polymers, the increase in molecular weights being substantially linear with conversion and a narrowed distribution of molecular weights around a mean value.

For this purpose, the present invention provides a novel type of synthesis process for hydrophilic polymers, which combines the specificities of gel polymerization with controlled radical polymerization. Against all expectations, it is found that this novel type of process allows accumulation of the advantages of each of these two processes without maintaining the harmful aspects.

More precisely, according to a first aspect, the present invention provides a process for preparing a polymer comprising at least one gel polymerization step (E) in which the following are placed in contact in general in an aqueous medium:

ethylenically unsaturated water-soluble monomers, the same or different;

a source of free radicals adapted to polymerization of the said monomers, typically a redox system; and a control agent to control radical polymerization, preferably comprising a thiocarbonylthio —S(C=S)— group, with a concentration of monomers in the reaction medium at step (E) that is sufficiently high to cause gelling of the medium if polymerization were conducted without any control agent.

The work conducted by the inventors in the present invention has now made it possible to evidence that the implementing of step (E) which schematically entails the use, under gel synthesis conditions, of a polymerization control agent of the type used for the synthesis of controlled polymers of low molecular weight, leads to the formation of polymers having both a controlled size and a large size which proves to be particularly unexpected in the light of the maximum sizes that are currently able to be obtained using controlled radical polymerization methods. Under the conditions of step (E), it is shown to be possible to control the number-average molecular weight of polymers up to very high values, which allows the synthesis of polymers and copolymers of controlled architecture having at least one hydrophilic sequence both of high mass and controlled mass.

As with usual controlled radical polymerization, the process of step (E) leads to the synthesis of polymers whose number-average molecular weight $M_n$ can be regulated by acting on the initial concentration of control agent in the medium, the value of $M_n$ being all the higher the lower this initial concentration of control agent. By adjusting this concentration, step (E) may typically lead to the synthesis of a hydrophilic polymer block having a molecular weight Mn higher than 500 000 g/mol, for example between 500 000 and 1 000 000 g/mol. Therefore it is found that at step (E) effective control is obtained over the average molecular weight of polymers, of similar type to that obtained with conventional controlled radical polymerization methods, with the exception that this control proves to be efficient up to very large sizes (possibly of up to 1 000 000 g/mol, and even higher. According to one embodiment of interest of the process of the invention, at step (E) the initial concentration of control agent in the medium is chosen so that the number-average molecular weight Mn of the synthesized hydrophilic polymer block is higher than 100 000 g/mol, preferably 500 000 g/mol or higher, for example between 500 000 and 1 000 000 g/mol.

Also, it is found in even more unexpected manner that the use of a radical polymerization control agent at step (E) generally allows a reduction even the total inhibition of the exothermic phenomena generally observed in gel polymerization processes.

Taking into account these different advantages, the process of the invention forms a particularly adapted process for preparing hydrophilic polymers, optionally block polymers, of high molecular weight.

In general, in the process of the invention, the conditions to be applied at step (E) may typically be modelled on those typically used for gel polymerizations well known to persons skilled in the art. On this matter concerning the conditions to be used for gel polymerization, particular reference can be made to U.S. Pat. No. 3,002,960, U.S. Pat. No. 3,022,279, U.S. Pat. No. 3,480,761, U.S. Pat. No. 3,929,791, U.S. Pat. No. 4,455,411 or U.S. Pat. No. 7,449,439, or to: *Iranian Polymer Journal*, 14 (7), pp 603-608 (2005).

It is well known to those skilled in the art that gel polymerization leads to the formation of a physical gel which is related to the entangling of straight or substantially straight long chains in solution. The dissolution of the said gel in solution may therefore lead to reversible non-entangled straight chains.

The hydrophilic monomers used at step (E) are typically those adapted to gel polymerization.

These monomers may particularly comprise acrylic acid (AA). According to one possible embodiment, the monomers are all acrylic acids, but it can also be envisaged to use as monomers a mixture comprising inter alia acrylic acid in a mixture with other hydrophilic monomers.

According to another embodiment, the monomers used at step (E) comprise (and typically are formed of) acrylamide monomers, or more generally acrylamido monomers. By acrylamido monomers is meant the family of monomers including acrylamide, its sulfonate derivative (AMPS) and quaternary ammonium (APTAC).

The acrylamide used at step (E) is preferably an acrylamide not stabilized with copper, which would give rise to exothermic problems unless a copper complexing agent such as EDTA is added. When applicable, the content of complexing agent in the reaction medium is preferably of the order of 20 to 2000 ppm. When acrylamide is used at step (E), it may typically be used in powder form, in an aqueous solution (optionally but not necessarily stabilized with monomethyl ether of hydroquinone MEHQ, or else with copper salts preferably with the addition of EDTA when applicable).

Irrespective of their exact type, the monomers at step (E) are used at relatively high concentrations, namely sufficient to ensure the formation of the gel if step (E) were conducted without any control agent. In other words, the monomers are used at a concentration adapted for the conducting of gel polymerization, which are well known to persons skilled in this type of polymerization. Typically, the initial concentration of monomers in the reaction medium at step (E) is at least 10%, even at least 20% by weight relative to the total weight of the reaction medium. In particular, to further limit exothermic phenomena, it is nevertheless generally preferable that this concentration should remain lower than 40%, preferably lower than 35%, even lower than 30% by weight relative to the total weight of the reaction medium. Preferably, this initial concentration of monomers in the reaction medium at step (E) is between 15% and 35%, for example between 20 and 25 weight % relative to the total weight of the reaction medium. Although these concentration conditions are used at step (E), they do not necessarily lead to gelling of the reaction medium during polymerization, owing to the presence of the control agent. In some cases, the system gels during polymerization, but it may remain more fluid in other cases. At all events, step (E) allows polymerization of controlled type contrary to gel polymerization of conventional type conducted without any additional control agent.

According to one particular embodiment, the monomers used at step (E) are heat-sensitive macromonomers, water-insoluble over and above a certain temperature (cloud point) but soluble at a lower temperature, step (E) being conducted at a lower temperature than the cloud point. The macromonomers of this type typically have a polymerisable function of acrylamido type, and a side chain composed of chains of ethylene oxide or propylene oxide (block or statistical) or else containing N-isopropylacrylamide, or N-vinylcaprolactame. This embodiment therefore particularly gives access to the preparation of polymers having thermo-thickening properties which can be used in the oil industry for example.

Also, it is possible at step (E) of the process of the invention to use any source of free radicals known per se as being suitable for gel polymerization methods. However, preferably, it generally proves to be preferable to use a radical initiator of redox type for this purpose, which has the advantage of not requiring heating of the reaction medium (no heat initiation) allowing even better management of the exothermicity of the reaction.

For example, the source of free radicals used may typically be chosen from among the redox initiators conventionally used for radical polymerization, which typically do not necessitate heating for their thermal initiation. They are typically a mixture of at least one oxidizing agent with at least one reducing agent.

The oxidizing agent present in the redox system is preferably a water-soluble agent. This oxidizing agent may be chosen for example from among the peroxides such as: hydrogen peroxide, tert-butyl hydroperoxide, cumene hydroperoxide, t-butyl-peroxyacetate, t-butyl-peroxybenzoate, t-butylperoxyoctoate, t-butylperoxyneodecanoate, t-butylperoxyisobutarate, lauroyl peroxide, t-amylperoxypivalte, t-butyl peroxypivalate, dicumyl peroxide, benzoyl peroxide; sodium persulfate, potassium persulfate, ammonium persulfate, or potassium bromate.

The reducing agent contained in the redox system is also preferably a water-soluble agent. This reducing agent may typically be chosen from among sodium formaldehyde sulfoxylate (particularly in its dihydrate form known as Rongalit or in anhydride form), ascorbic acid, erythorbic acid, sulfites, bisulfites or metasulfites (sulfites, bisulfites or metasulfites of alkaline metals in particular), nitrilotrispropionamides, and tertiary amines and ethanolamines (preferably water-soluble).

Possible redox systems comprise combinations such as:
mixtures of water-soluble persulfates with water-soluble tertiary amines;
mixtures of water-soluble bromates (e.g. bromates of alkaline metals) with water-soluble sulfites (e.g. sulfites of alkaline metals);
mixtures of hydrogen peroxide, alkyls, peresters, percarbonates and similar and of any iron salts, titanous salts, zinc formaldehyde sulfoxylate or sodium formaldehyde sulfoxylate, and reducing sugars;
persulfates, perborates or perchlorates of alkaline metals or of ammonium in association with an alkaline metal bisulfite such as sodium metabisulfite, reducing sugars; and
alkaline metal persulfates in association with an arylphosphinic acid, such as benzene phosphonic acid and similar and reducing sugars.

A redox system of interest comprises (and preferably consists of) the association for example of ammonium persulfate with sodium formaldehyde sulfoxylate.

In general, and particularly if a redox system is used of ammonium persulfate/sodium formaldehyde sulfoxyalte type, it proves preferable that the reaction medium at step (E) should be free of copper. If copper is present, it is generally desirable to add a copper complexing agent such as EDTA.

The type of control agent used at step (E) may vary to a large extent.

According to one variant of interest, the control agent used at step (E) is a compound carrying a thiocarbonylthio —S(C=S)— group. According to one particular embodiment, the control agent may carry several thiocarbonylthio groups.

It may optionally be a polymer chain carrying a said group. Therefore, according to one particular embodiment, the control agent used at step (E) is a living polymer derived from a prior step ($E_0$) in which radical polymerization was performed of a composition comprising:

ethylenically unsaturated monomers;
a control agent of the radical polymerization comprising at least one thiocarbonylthio —S(C=S)— group; and
a radical polymerization initiator (source of free radicals).

According to this embodiment, step (E) leads to a sequenced copolymer comprising at least one hydrophilic block of very high molecular weight linked to the polymer chain derived from the polymerization at step ($E_0$).

More generally, the control agent used at step (E) advantageously meets formula (A) below:

(A)

where:
Z represents:
a hydrogen atom;
a Chlorine atom;
an optionally substituted alkyl radical, optionally substituted aryl radical;
an optionally substituted heterocycle;
an optionally substituted alkylthio radical;
an optionally substituted arylthio radical;
an optionally substituted alkoxy radical;
an optionally substituted aryloxy radical;
an optionally substituted amino radical;
an optionally substituted hydrazine radical;
an optionally substituted alkoxycarbonyl radical;
an optionally substituted aryloxycarbonyl radical;
an optionally substituted carboxy, acyloxy radical;
an optionally substituted aroyloxy radical;
an optionally substituted carbamoyl radical;
a cyano radical;
a dialkyl- or diaryl-phosphonato radical;
a dialkyl-phosphinato or diaryl-phosphinato radical; or
a polymer chain.
and
$R_1$ represents:
an optionally substituted alkyl, acyl, aryl, aralkyl, alkene or alkyne group;
a carbon ring or a heterocycle whether or not saturated, aromatic, optionally substituted; or
a polymer chain.

The $R_1$ or Z groups, when substituted, may be substituted by optionally substituted phenyl groups, optionally substituted aromatic groups, saturated or unsaturated carbon rings, saturated or unsaturated heterocycles, or the groups: alkoxycarbonyl or aryloxycarbonyl (—COOR), carboxy (—COOH), acyloxy (—O$_2$CR), carbamoyl (—CONR$_2$), cyano (—CN), alkylcarbonyl, alkylarylcarbonyl, arylcarbonyl, arylalkylcarbonyl, phtalimido, maleimido, succinimido, amidino, guanidimo, hydroxy (—OH), amino (—NR$_2$), halogen perfluoroalkyl $C_nF_{2n+1}$ allyl, epoxy, alkoxy (—OR), S-alkyl, S-aryl, groups of hydrophilic or ionic nature such as alkaline salts of carboxylic acids, alkaline salts of sulfonic acid, alkylene polyoxide chains (PEO, POP), cationic substituents (quaternary ammonium salts), R being an alkyl or aryl group or a polymer chain.

According to one particular embodiment, $R_1$ is an alkyl group whether or not substituted, preferably substituted.

The optionally substituted alkyl, acyl, aryl, aralkyl or alkyne groups generally have 1 to 20 carbon atoms, preferably 1 to 12, more preferably 1 to 9 carbon atoms. They may be straight-chain or branched. They may also be substituted by oxygen atoms particularly in the form of esters, sulfur or nitrogen atoms.

Among the alkyl radicals, particular mention can be made of the methyl, ethyl, propyl, butyl, pentyl, isopropyl, tert-butyl, pentyl, hexyl, octyl, decyl or dodecyl radicals.

The alkyne groups are radicals generally having 2 to 10 carbon atoms, they have at least one acetylenic unsaturation, such as the acetylenyl radical.

The acyl group is a radical generally having 1 to 20 carbon atoms with a carbonyl group.

Among the aryl radicals, the phenyl radical can notably be cited, optionally substituted in particular by a nitro or hydroxyl function.

Among the aralkyl radicals, the benzyl or phenethyl radical can notably be cited, optionally substituted in particular by a nitro or hydroxyl function.

If $R_1$ or Z is a polymer chain this polymer chain can be derived from radical or ionic polymerization or from polycondensation.

In the present invention, it is of particular interest to use xanthates, trithiocarbonates, dithiocarbamates, or dithiocarbazates as control agents.

Advantageously, as control agent at step (E), compounds are used which carry an —S(C=S)O— xanthate function, e.g. a carrier of an O-ethyl xanthate function of formula —S(C=S)OCH$_2$CH$_3$, for example O-ethyl-S-(1-methoxycarbonyl ethyl) xanthate of formula (CH$_3$CH(CO$_2$CH$_3$))S(C=S)OEt.

Another possible control agent at step (E) is dibenzyltrithiocarbonate of formula PhCH$_2$S(C=S)SCH$_2$Ph (where Ph=phenyl).

According to one particular embodiment, the control agent used at step (E) is a living polymer carrying a thiocarbonylthio function, in particular xanthate, for example O-ethyl xanthate, prepared at a controlled radical polymerization step prior to step (E).

According to one embodiment of step (E) of interest, this step is implemented without any cross-linking agent. Nonetheless, in the more general case, the use of a cross-linking agent is not excluded at step (E).

According to another particular aspect, the subject of the present invention concerns polymers such as obtained with the process of the invention, which comprise at least one hydrophilic polymer block of controlled mass in the region of an average value $M_n$ of at least 100 000 g/mol, preferably at least 500 000 g/mol, for example between 500 000 and 1 000 000 g/mol.

In particular, the subject of the invention concerns polymers such as obtained with the process of the invention and which comprise at least one polyacrylamide block of size greater than 100 000 g/mol, preferably of at least 500 000 g/mol, for example between 500 000 and 1 000 000 g/mol.

According to one particular embodiment, the polymers such as obtained after the process of the invention are linear, namely they are solely formed of a straight chain of monomers (on the understanding that each monomer of the chain may optionally carry a side group). The straight-chain polymers in the meaning of the present description differ in particular from branched polymers which comprise a straight chain of monomers and at least one branch on which another chain of monomers is grafted.

The hydrophilic polymers of controlled high molecular weight according to the invention may advantageously be used in different types of applications.

They may particularly be used as rheology regulating agent (e.g. for petrochemical applications) or as flocculating agent (used in the paper industry or for the treatment of waste water in particular). They may also be used as thickeners, or as viscosity-increasing, gelling or surface modifying agents, and to prepare nanohybrid materials. More generally, they can also be used as vectoring agent.

Different characteristics and advantages of the invention will be further illustrated by the examples below in which polymers were prepared using the process of the invention.

In these examples, the number-average molar weight of the synthesized polymers was compared, by way of indication, with the theoretical number-average molecular weight which would be obtained with perfectly controlled polymerization, thereby validating the particularly well controlled nature of the polymerization performed according to the invention, differing radically from the results usually obtained when gel polymerization conditions are applied. The theoretical number-average molecular weight to which reference is made here is calculated using the following formula:

$$\overline{Mn}(theo) = \frac{[M]_0}{[X]_0} \times M_{MU} \times Conv. + M_x$$

where:
$Mn_{(theo)}$=theoretical number-average weight
$[M]_0$=initial concentration of monomer
$[X]_0$=initial concentration of control agent
$M_{MU}$=molecular weight of the monomer
Conv.=conversion of the monomer (yield of the reaction)
$M_x$=molecular weight of the control agent EXAMPLE 1: SYNTHESIS OF A POLYACRYLAMIDE ACCORDING TO THE INVENTION (CONTROL AGENT: LIVING PRE-POLYMER WITH XANTHATE FUNCTION; INITIATOR PAIR: AMMONIUM PERSULFATE/SODIUM FORMALDEHYDE SULFOXYLATE)

1.1: Synthesis of a Living Polyacrylamide Pre-Polymer P1

To a 50 mL flask were added at ambient temperature (20° C.), 6 g of powdered acrylamide (the acrylamide powder used in all the examples was free of copper), 15.2 g of distilled water, 2.53 g of O-ethyl-S-(1-methoxycarbonyl ethyl) xanthate of formula (CH$_3$CH(CO$_2$CH$_3$))S(C=S)OEt, 8 g of ethanol and 150 mg of V-50 initiator (2,2'-Azobis(2-methylpropionamidine)dihydrochloride). The mixture was degassed by bubbling extra-pure argon for 30 minutes. The flask was then placed in a thermostat-controlled oil bath at 60° C., and the polymerization reaction left to take place under agitation for 3 hours at 60° C. 100% conversion was obtained (determined by $^1$H NMR). The number-average molecular weight of the pre-polymer P1, determined by $^1$H NMR, was 750 g/mol.

1.2: Gel Polymerization of the Acrylamide (Using P1 as Control Agent)

After step 1.1, the reaction mixture was dried in vacuo to evaporate the ethanol and the extract was readjusted by adding distilled water to obtain an aqueous 50 weight % solution 51 of the pre-polymer P1.

To a 200 mL flask, at ambient temperature, were added 20 g powdered acrylamide, 56 g distilled water and 30 mg of solution 51. The mixture was degassed by bubbling extrapure argon for 30 minutes, after which the temperature of the solution was lowered to 10° C. Ammonium persulfate and sodium formaldehyde sulfoxylate were added to the medium in a single addition in the form of two 0.6 weight % aqueous solutions, 2 mL of each of the solutions being added. These two aqueous solutions of ammonium persulfate and sodium formaldehyde sulfoxylate were previously degassed by bubbling argon.

The polymerization reaction was left to take place under agitation for 24 hours at ambient temperature (20° C.).

After a reaction time of 24 hours, 98% conversion was obtained (determined by $^1$H NMR). Analysis by size exclusion chromatography in water with the addition of $NaNO_3$ (0.1N) and using an eighteen-angle MALLS detector gave the following number-average molecular weight ($M_n$) and polymolecularity index values:

$M_n$=1 062 000 g/mol $M_w/M_n$=1.89.

For comparison, the theoretical number-average molecular weight is 990 00 g/mol

EXAMPLE 2: SYNTHESIS OF A POLYACRYLAMIDE ACCORDING TO THE INVENTION (CONTROL AGENT: LIVING PRE-POLYMER WITH XANTHATE FUNCTION; INITIATOR PAIR: AMMONIUM PERSULFATE/SODIUM FORMALDEHYDE SULFOXYLATE)

The same pre-polymer P1 as for Example 1 was used in this Example, prepared under the conditions of step 1.1 in Example 1 and used in the form of the same aqueous solution et S1 as in step 1.2 of Example 1.

To a 200 mL flask, at ambient temperature, were added 20 g acrylamide powder, 56 g distilled water and 35 mg of solution S1. The mixture was degassed by bubbling extrapure argon for 30 minutes, after which the temperature of the solution was lowered to 10° C. Ammonium persulfate and sodium formaldehyde sulfoxylate were added to the medium in a single addition, in the form of two 0.6 wt. % aqueous solutions, 2 mL of each of the solutions being added. As in Example 1, the two aqueous solutions of ammonium persulfate and sodium formaldehyde sulfoxylate were previously degassed by bubbling argon.

The polymerization reaction was left to take place under agitation for 24 hours at ambient temperature (20° C.).

After the reaction time of 24 hours, 96% conversion was obtained (determined by $^1$H NMR). Analysis by size exclusion chromatography in water with the addition of $NaNO_3$ (0.1N) and using an eighteen-angle MALLS detector gave the following number-average molecular weight ($M_n$) and polymolecularity index ($M_w/M_n$) values:

$M_n$=846 000 g/mol $M_w/M_n$=1.89.

For comparison, the theoretical number-average molecular weight is 812 00 g/mol.

EXAMPLE 3: SYNTHESIS OF A POLYACRYLAMIDE ACCORDING TO THE INVENTION (CONTROL AGENT: LIVING PRE-POLYMER WITH XANTHATE FUNCTION; INITIATOR PAIR: AMMONIUM PERSULFATE/SODIUM FORMALDEHYDE SULFOXYLATE)

Here again, the same pre-polymer P1 as the one in Example 1 was used prepared under the conditions of step 1.1 in Example 1 and used in the form of the same aqueous solution S1 as in step 1.2 of Example 1.

To a 200 mL flask, at ambient temperature, were added 20 g of powder acrylamide, 56 g distilled water and 50 mg of solution S1. The mixture was degassed by bubbling extrapure argon for 30 minutes, after which the temperature of the solution was lowered to 10° C. Ammonium persulfate and sodium formaldehyde sulfoxylate were added to the medium in a single addition, in the form of two 0.6 wt. % aqueous solutions, 2 mL of each of the solutions being added. As in Example 1, the two aqueous solutions of ammonium persulfate and sodium formaldehyde sulfoxylate were previously degassed by bubbling argon.

The polymerization reaction was then left to take place under agitation for 24 hours at ambient temperature (20° C.).

After the reaction time of 24 hours, 88% conversion was obtained (determined by $^1$H NMR). Analysis by size exclusion chromatography in water with the addition of $NaNO_3$ (0.1N) and using an eighteen-angle MALLS detector gave the following number-average molecular weight ($M_n$) and polymolecularity index ($M_w/M_n$) values:

$M_n$=640 000 g/mol $M_w/M_n$=1.81.

For comparison, the theoretical number-average molecular weight is 530 000 g/mol.

EXAMPLE 4: SYNTHESIS OF A POLYACRYLAMIDE ACCORDING TO THE INVENTION (CONTROL AGENT: LIVING PRE-POLYMER WITH XANTHATE FUNCTION; INITIATOR PAIR: AMMONIUM PERSULFATE/SODIUM FORMALDEHYDE SULFOXYLATE)

The same pre-polymer P1 as in Example 1 was used, prepared under the conditions of step 1.1 in Example 1 and used in the form of the same aqueous solution S1 as in step 1.2 of Example 1.

To a 200 mL flask, at ambient temperature, were added 10 g of powder acrylamide, 26 g distilled water and 35 mg of solution S1. The mixture was degassed by bubbling extrapure argon for 30 minutes, after which the temperature of the solution was lowered to 10° C. Ammonium persulfate and sodium formaldehyde sulfoxylate were added to the medium in a single addition, in the form of two 0.6 wt. % aqueous solutions, 1 mL of each of the solutions being added. As in Example 1, the two aqueous solutions of ammonium persulfate and sodium formaldehyde sulfoxylate were previously degassed by bubbling argon.

The polymerization reaction was left to take place under agitation for 24 hours at ambient temperature (20° C.).

After the reaction time of 24 hours, 100% conversion was obtained, determined by $^1$H NMR. Analysis by size exclusion chromatography in water with the addition of $NaNO_3$ (0.1N) and using an eighteen-angle MALLS detector gave the following number-average molecular weight ($M_n$) and polymolecularity index ($M_w/M_n$) values:

$M_n$=452 700 g/mol $M_w/M_n$=1.59.

For comparison, the theoretical number-average molecular weight is 410 000 g/mol

EXAMPLE 5: SYNTHESIS OF A POLYACRYLAMIDE ACCORDING TO THE INVENTION (CONTROL AGENT: LIVING PRE-POLYMER WITH XANTHATE FUNCTION; INITIATOR PAIR: AMMONIUM PERSULFATE/SODIUM FORMALDEHYDE SULFOXYLATE)

The same pre-polymer P1 as in Example 1 was used, prepared under the conditions of step 1.1 in Example 1 and used in the form of the same aqueous solution 51 as in step 1.2 of Example 1.

To a 200 mL flask, at ambient temperature, were added 10 g of powder acrylamide, 26 g distilled water and 150 mg of solution 51. The mixture was degassed by bubbling with extra-pure argon for 30 minutes, after which the temperature of the solution was lowered to 10° C. Ammonium persulfate and sodium formaldehyde sulfoxylate were added to the medium in a single addition, in the form of two 0.6 wt. % aqueous solutions, 1 mL of each of the solutions being added. As in Example 1, the two aqueous solutions of ammonium persulfate and sodium formaldehyde sulfoxylate were previously degassed by bubbling argon.

The polymerization reaction was then left to take place under agitation for 24 hours at ambient temperature (20° C.).

After the 24-hour reaction time 100% conversion was obtained, determined by $^1$H NMR. Analysis by size exclusion chromatography in water with the addition of $NaNO_3$ (0.1N) and using an eighteen-angle MALLS detector gave the following number-average molecular weight ($M_n$) and polymolecularity index ($M_w/M_n$) values:

$M_n$=103 700 g/mol $M_w/M_n$=1.59.

For comparison, the theoretical number-average molecular weight is 100 000 g/mol Although Examples 1 to 5 were conducted with a non-stabilized acrylamide, similar results were obtained with stabilized acrylamides, using copper salts for example (with the addition of a complexing agent of EDTA type to prevent exothermicity) or else using MEHQ.

EXAMPLE 6: SYNTHESIS OF A POLY(ACRYLIC ACID)-B-POLY(ACRYLAMIDE) DIBLOCK COPOLYMER: SYNTHESIS OF THE POLYACRYLAMIDE BLOCK ACCORDING TO THE INVENTION (CONTROL AGENT: LIVING POLYACRYLATE WITH XANTHATE TERMINATION; INITIATOR PAIR: AMMONIUM PERSULFATE/SODIUM FORMALDEHYDE SULFOXYLATE)

6.1: Synthesis of a Living Poly(Acrylic Acid) with Xanthate Termination (Polymer P6)

To a 15 mL flask, at ambient temperature, were added 4 g acrylic acid, 3.2 g distilled water, 0.8 g ethanol, 87 mg O-ethyl-S-(1-methoxycarbonyl ethyl) xanthate of formula $(CH_3CH(CO_2CH_3))S(C=S)OEt$ and 25 mg 4,4'-Azobis(4-cyanovaleric acid). The mixture was degassed by bubbling extra-pure argon for 30 minutes.

The flask was then placed in a thermostat-controlled oil bath at 60° C., and the reaction medium left under agitation for 2 hours at 60° C.

After these two hours, 99% conversion was determined by $^1$H NMR.

Analysis by size exclusion chromatography in water with the addition of $NaNO_3$ (0.1N) and using an eighteen-angle MALLS detector gave the following number-average molecular weight ($M_n$) and polymolecularity index ($M_w/M_n$) values for the P6 polymer thus obtained:

$M_n$=13 000 g/mol $M_w/M_n$=1.52.

6.2: Synthesis of the Diblock Copolymer

After step 6.1, the reaction mixture was dried in vacuo then dissolved in ethanol and precipitated in diethylether. The precipitate obtained was dried in vacuo for 24 hours to remove the residual solvents, after which the P6 polymer was obtained in the form of a dried powder.

20 mg of this dried powder of the P6 polymer were added to a 15 mL flask, at ambient temperature, and 2 g of powder acrylamide and 5.6 g of distilled water were added to the flask.

The mixture was degassed by bubbling extra-pure argon for 30 minutes, after which the temperature of the solution was lowered to 10° C. Ammonium persulfate and sodium formaldehyde sulfoxylate were added to the medium in a single addition, in the form of two 0.6 wt. % aqueous solutions, 0.2 mL of each of the solutions being added. The two aqueous solutions of ammonium persulfate and sodium formaldehyde sulfoxylate were previously degassed by bubbling argon.

The polymerization reaction was left to take place under agitation for 24 hours at ambient temperature (20° C.).

After the 24-hour reaction time, 96% conversion was obtained, such as determined by $^1$H NMR.

Analysis by size exclusion chromatography in water with the addition of $NaNO_3$ (0.1N) using an eighteen-angle MALLS detector gave the following number-average molecular weight ($M_n$) and polymolecularity index ($M_w/M_n$) values:

$M_n$=682 000 g/mol $M_w/M_n$=2.18.

For comparison, the theoretical number-average molecular weight is 890 000 g/mol EXAMPLE 7: SYNTHESIS OF A POLY(ACRYLIC ACID-B-POLY(ACRYLAMIDE) DIBLOCK COPOLYMER; SYNTHESIS OF THE POLYACRYLAMIDE BLOCK ACCORDING TO THE INVENTION (CONTROL AGENT: LIVING POLYACRYLATE WITH XANTHATE TERMINATION; INITIATOR PAIR: AMMONIUM PERSULFATE/SODIUM FORMALDEHYDE SULFOXYLATE)

The same polymer P6 as the one in Example 6 was used for this Example, used in the form of a powder prepared under the conditions of step 6.2 in Example 6.

210 mg of P6 polymer powder were placed in a 15 mL flask, at ambient temperature, and 2 g of powder acrylamide and 5.6 g of distilled water were added to the flask.

The mixture was degassed by bubbling with extra-pure argon for 30 minutes, after which the temperature of the solution was lowered to 10° C. Ammonium persulfate and sodium formaldehyde sulfoxylate were added to the medium in a single addition in the form of two 0.6 wt. % aqueous solutions, 0.2 mL of each of the solutions being added. The two aqueous solutions of ammonium persulfate and sodium formaldehyde sulfoxylate were previously degassed by bubbling argon.

The polymerization reaction was left to take place under agitation for 24 hours at ambient temperature (20° C.).

After the 24-hour reaction time, 99% conversion was obtained as determined by $^1$H NMR.

Analysis by size exclusion chromatography in water with the addition of $NaNO_3$ (0.1N) and using an eighteen-angle MALLS detector gave the following number-average molecular weight ($M_n$) and polymolecularity index ($M_w/M_n$) values:

$M_n$=108 000 g/mol $M_w/M_n$=1.46.

For comparison, the theoretical number-average molecular weight is 100 000 g/mol

EXAMPLE 8: SYNTHESIS OF A POLY(2-ACRYLAMIDO-2-METHYLPROPANE SULFONIC ACID)-B-POLY(ACRYLAMIDE) DIBLOCK COPOLYMER; SYNTHESIS OF THE POLYACRYLAMIDE BLOCK ACCORDING TO THE INVENTION (CONTROL AGENT: LIVING POLY(AMPS) WITH XANTHATE TERMINATION; INITIATOR PAIR: AMMONIUM PERSULFATE/SODIUM FORMALDEHYDE SULFOXYLATE)

8.1 Synthesis of a Living Poly(2-Acrylamido-2-methylpropane Sulfonic Acid) with Xanthate Termination (Polymer P8)

To a 25 mL flask at ambient temperature, were added 8 g of an aqueous solution of 2-acrylamido-2-methylpropane sulfonic acid (AMPS; concentration: 50 weight %), 1.4 g distilled water, 1.2 g ethanol, 90 mg of O-ethyl-S-(1-methoxycarbonyl ethyl) xanthate of formula $(CH_3CH(CO_2CH_3))S(C=S)OEt$ and 40 mg of 4,4'-Azobis(4-cyanovaleric acid). The mixture was degassed by bubbling with extra-pure argon for 30 minutes.

The flask was then placed in a thermostat-controlled oil bath at 60° C., and the reaction medium was left under agitation for 2 hours at 60° C.

After these two hours, 99% conversion was determined by $^1$H NMR.

Analysis by size exclusion chromatography in water with the addition of $NaNO_3$ (0.1N) and using an eighteen-angel MALLS detector gave the following number-average molecular weight ($M_n$) and polymolecularity index ($M_w/M_n$) values:

$M_n$=10 700 g/mol $M_w/M_n$=1.45.

8.2: Synthesis of the Diblock Copolymer

After step 8.1, the reaction mixture was dried in vacuo then dissolved in ethanol and precipitated in diethylether. The precipitate obtained was dried in vacuo for 24 hours to remove residual solvents, after which the P8 polymer was obtained in the form of a dried powder.

20 mg of this dried P8 polymer powder were placed in a 15 mL flask, at ambient temperature, and 2 g of powder acrylamide and 5.6 g of distilled water were added.

The mixture was degassed by bubbling with extra-pure argon for 30 minutes, after which the temperature of the solution was lowered to 10° C. Ammonium persulfate and sodium formaldehyde sulfoxylate were added to the medium in a single addition in the form of two 0.6 wt. % aqueous solutions, 0.2 mL of each of the solutions being added. The two aqueous solutions of ammonium persulfate and sodium formaldehyde sulfoxylate were previously degassed by bubbling argon.

The polymerization reaction was left to take place under agitation for 24 hours at ambient temperature (20° C.).

After the 24-hour reaction time, 96% conversion was obtained as determined by $^1$H NMR.

Analysis by size exclusion chromatography in water with the addition of $NaNO_3$ (0.1N) and using an eighteen angle MALLS detector gave the following number-average molecular weight ($M_n$) and polymolecularity index ($M_w/M_n$) values:

$M_n$=730 000 g/mol $M_w/M_n$=2.51.

For comparison, the theoretical number-average molecular weight is 950 000 g/mol

EXAMPLE 9: SYNTHESIS OF A POLY(2-ACRYLAMIDO-2-METHYLPROPANE SULFONIC ACID)-B-POLY(ACRYLAMIDE) DIBLOCK COPOLYMER; SYNTHESIS OF THE POLYACRYLAMIDE BLOCK ACCORDING TO THE INVENTION (CONTROL AGENT: LIVING POLY(AMPS) WITH XANTHATE TERMINATION; INITIATOR PAIR: AMMONIUM PERSULFATE/SODIUM FORMALDEHYDE SULFOXYLATE)

The same P8 polymer as in Example 8 was used for this Example, used in the form of a powder prepared under the conditions of step 8.2 in Example 8.

215 mg of the P8 polymer powder were placed in a 15 mL flask, at ambient temperature, and 2 g of powder acrylamide and 5.6 g of distilled water were added.

The mixture was degassed by bubbling with extra-pure argon for 30 minutes, after which the temperature of the solution was lowered to 10° C. Ammonium persulfate and sodium formaldehyde sulfoxylate were added to the medium in a single addition in the form of two 0.6 wt. % aqueous solutions, 0.2 mL of each of the solutions being added. The two aqueous solutions of ammonium persulfate and sodium formaldehyde sulfoxylate were previously degassed by bubbling argon.

The polymerization reaction was left to take place under agitation for 24 hours at ambient temperature (20° C.).

After the 24-hour reaction time, 100% conversion was obtained as determined by $^1$H NMR.

Analysis by size exclusion chromatography in water with the addition of $NaNO_3$ (0.1N) and using an eighteen-angle MALLS detector gave the following number-average molecular weight ($M_n$) and polymolecularity index ($M_w/M_n$) values:

$M_n$=105 000 g/mol $M_w/M_n$=2.44.

For comparison, the theoretical number-average molecular weight is 100 000 g/mol

EXAMPLE 10: SYNTHESIS OF A POLY(ACRYLAMIDOPROPYLTRIMETHYLAMMONIUM CHLORIDE)-B-POLY(ACRYLAMIDE) DIBLOCK COPOLYMER; SYNTHESIS OF THE POLYACRYLAMIDE BLOCK ACCORDING TO THE INVENTION (CONTROL AGENT: LIVING POLYMER WITH XANTHATE TERMINATION; INITIATOR PAIR: AMMONIUM PERSULFATE/SODIUM FORMALDEHYDE SULFOXYLATE)

10.1: Synthesis of the Living Poly(Acrylamidopropyltrimethylammonium Chloride) Polymer with Xanthate Termination (Polymer P10)

To a 25 mL flask, at ambient temperature, were added 8 g of acrylamidopropyltrimethylammonium chloride solution (75 wt. % solution in water), 3.9 g distilled water, 1.3 g ethanol, 130 mg of O-ethyl-S-(1-methoxycarbonyl ethyl) xanthate of formula $(CH_3CH(CO_2CH_3))S(C=S)OEt$ and 30 mg of V-50 initiator (2,2'-Azobis(2-methylpropionamidine) dihydrochloride). The mixture was degassed by bubbling with extra-pure argon for 30 minutes.

The flask was then placed in a thermostat-controlled oil bath at 60° C., and the reaction medium was left under agitation for 2 hours at 60° C.

After these two hours, 99% conversion was determined by $^1$H NMR.

Analysis by size exclusion chromatography in water with the addition of NaNO$_3$ (0.1N) using an eighteen-angle MALLs detector gave the following number-average molecular weight (M$_n$) and polymolecularity index (M$_w$/M$_n$) values:

M$_n$=13 100 g/mol M$_w$/M$_n$=1.64.

10.2: Synthesis of the Diblock Copolymer

After step 10.1, the reaction medium was dried in vacuo then dissolved in ethanol and precipitated in diethylether. The precipitate obtained was dried in vacuo for 24 hours to remove the residual solvents after which the P10 polymer was obtained in the form of a dried powder.

20 mg of this dried P10 polymer powder were placed in a 15 mL flask, at ambient temperature, and 2 g of powder acrylamide and 5.6 g of distilled water were then added.

The mixture was degassed by bubbling with extra-pure argon for 30 minutes, after which the temperature of the solution was lowered to 10° C. Ammonium persulfate and sodium formaldehyde sulfoxylate were added to the medium in a single addition in the form of two aqueous 0.6 wt. % solutions, 0.2 mL of each of the solutions being added. The two aqueous solutions of ammonium persulfate and sodium formaldehyde sulfoxylate were previously degassed by bubbling argon.

The polymerization reaction was left to take place under agitation for 24 hours at ambient temperature (20° C.).

After the 24-hour reaction time, 99% conversion was obtained as determined by $^1$H NMR.

Analysis by size exclusion chromatography in water with the addition of NaNO$_3$ (0.1N) using an eighteen-angle MALLS detector gave the following number-average molecular weight (M$_n$) and polymolecularity index (M$_w$/M$_n$) values:

M$_n$=806 000 g/mol M$_w$/M$_n$=3.25.

For comparison, the number-average molecular weight is 900 000 g/mol

EXAMPLE 11: SYNTHESIS OF A POLY(ACRYLAMIDOPROPYLTRIMETHYLAMMONIUM CHLORIDE)-B-POLY(ACRYLAMIDE) DIBLOCK COPOLYMER; SYNTHESIS OF THE POLYACRYLAMIDE BLOCK ACCORDING TO THE INVENTION (CONTROL AGENT: LIVING POLYMER WITH XANTHATE TERMINATION; INITIATOR PAIR: AMMONIUM PERSULFATE/SODIUM FORMALDEHYDE SULFOXYLATE)

Step 1: Synthesis of the Poly(Acrylamidopropyltrimethyl-ammonium Chloride) Block.

The same polymer prepared in Example 8 was used.

Step 2: Synthesis of the Diblock Copolymer

The same P10 polymer as in Example 10 was used for this Example, used in the form of a powder prepared under the conditions of step 10.2 in Example 10.

215 mg of the P8 polymer powder were placed in a 15 mL flask, at ambient temperature and 2 g of powder acrylamide and 5.6 g of distilled water were added.

The mixture was degassed by bubbling with extra-pure argon for 30 minutes, after which the temperature of the solution was lowered to 10° C. Ammonium persulfate and sodium formaldehyde sulfoxylate were added to the medium in a single addition, in the form of two aqueous 0.6 wt. % solutions, 0.2 mL of each of the solutions being added. The two aqueous solutions of ammonium persulfate and sodium formaldehyde sulfoxylate were previously degassed by bubbling argon.

The polymerization reaction was left to take place under agitation for 24 hours at ambient temperature (20° C.).

After the 24-hour reaction time, 98% conversion was obtained as determined by $^1$H NMR.

Analysis by size exclusion chromatography in water with the addition of NaNO$_3$ (0.1N) using an eighteen-angle MALLS detector gave the following number-average molecular weight (M$_n$) and polymolecularity index (M$_w$/M$_n$) values:

M$_n$=160 500 g/mol M$_w$/M$_n$=2.0.

For comparison, the theoretical number-average molecular weight is 100 000 g/mol.

The invention claimed is:

1. A process for preparing a polymer comprising at least one polymerization in a reaction medium wherein the polymerization comprises contacting:
   ethylenically unsaturated water-soluble monomers, the same or different;
   a source of free radicals adapted to the polymerization of said monomers; and
   a radical polymerization control agent, wherein said control agent is a reversible transfer agent;
   wherein the polymerization is performed without any cross-linking agent and the concentration of monomers in the reaction medium of the polymerization is sufficiently high to cause gelling of the medium and lead to a non-covalent gel if polymerization was conducted without the control agent,
   wherein in the polymerization, the initial concentration of control agent in the medium is chosen so that the number-average molecular weight M$_n$ of the synthesized polymer is higher than 100,000 g/mol;
   wherein the control agent is a compound carrying an —S(C=S)O— xanthate function; and
   wherein number-average molecular weight M$_n$ of the synthesized polymer is of 500 000 g/mol or higher.

2. The process according to claim 1 wherein the monomers, the source of free radicals and the control agent are contacted in an aqueous medium.

3. The process according to claim 1 wherein the monomers comprise acrylamido monomers.

4. The process according to claim 1 wherein the initial concentration of monomers in the reaction medium is between 10 and 40% by weight relative to the total weight of the reaction medium.

5. The process according to claim 1 wherein the source of free radicals used is a redox initiator.

6. The process according to claim 5 wherein the source of free radicals is a redox system which is an association of ammonium persulfate and sodium formaldehyde sulfoxylate.

7. The process according to claim 1 wherein the reaction medium is free of copper.

8. The process according to claim 1, wherein the control agent is a compound carrying an O-ethyl xanthate function of formula —S(C=S)OCH$_2$CH$_3$.

* * * * *